No. 813,779. PATENTED FEB. 27, 1906.
W. COWERN.
MEANS FOR FILTERING OR PURIFYING WATER.
APPLICATION FILED APR. 29, 1905.
2 SHEETS—SHEET 1.
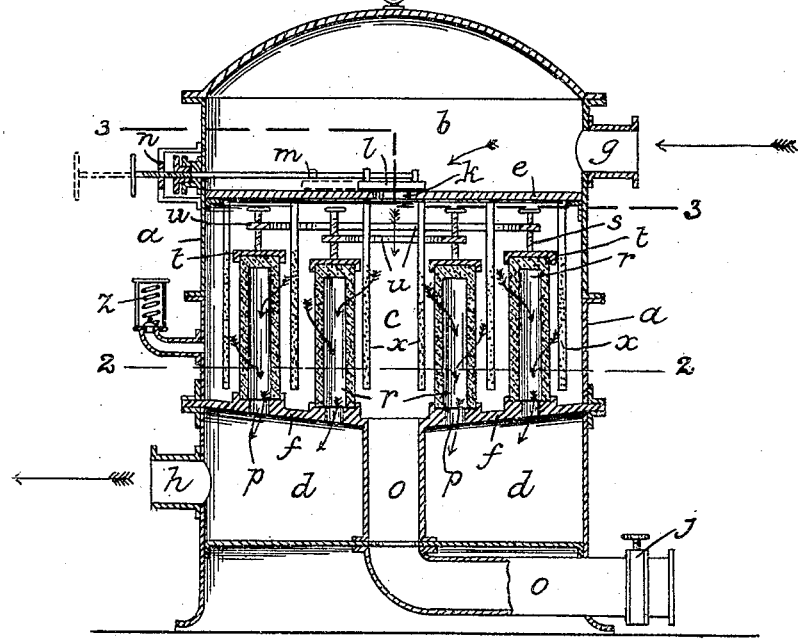
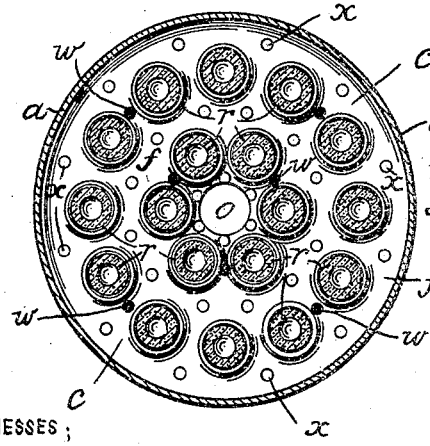
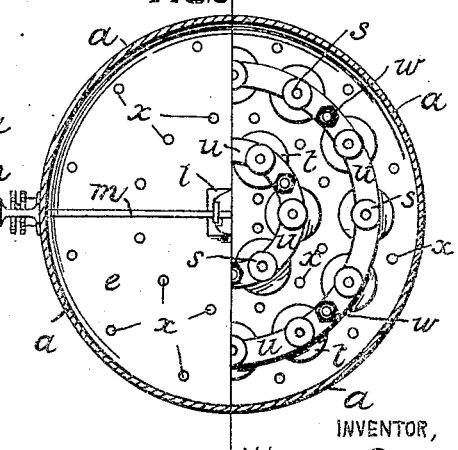
WITNESSES:
George G. Schoenlank
W. H. Berrigan
INVENTOR,
WILLIAM COWERN,
BY H. Van Oldenneel
ATTORNEY No. 813,779. PATENTED FEB. 27, 1906.
W. COWERN.
MEANS FOR FILTERING OR PURIFYING WATER.
APPLICATION FILED APR. 29, 1905.

2 SHEETS—SHEET 2.

WITNESSES:
George G. Schoenlank
Wm H. Berrigan

INVENTOR:
WILLIAM COWERN,
BY H van Oostenruel
ATTORNEY

UNITED STATES PATENT OFFICE.

WILLIAM COWERN, OF HAWERA, NEW ZEALAND.

MEANS FOR FILTERING OR PURIFYING WATER.

No. 813,779.     Specification of Letters Patent.     Patented Feb. 27, 1906.

Application filed April 29, 1905. Serial No. 257,986.

*To all whom it may concern:*

Be it known that I, WILLIAM COWERN, a subject of the King of Great Britain, residing at Hawera, in the Colony of New Zealand, have invented new and useful Means for Use in Filtering or Purifying Water or other Liquids; and I do hereby declare the following to be a full, clear, and exact description of the same.

This invention relates to means that have been specially designed for use in filtering water for town or city supplies, household supplies, army supplies, for purifying sewage, and for all other purposes where purified water or liquid is required. The means devised are particularly useful as a filter for the cleansing, filtering, or purifying water from microbes, bacteria, dirt, oil, grease, organic matter, or any other deleterious substances.

The invention consists in an adaptation of a filtering medium of porous stone, of which Oamaru stone or Mount Somers stone, found in New Zealand and the principal constituent of which is carbonate of lime, is indicated as specially applicable, although similar stone common to other countries may be used. The water or other liquid to be filtered is forced through the porous stone by gravitation, hydraulic, air, steam, electric, or any other source of pressure. The deleterious substances or impurities will be arrested by the porous stone and may be cleansed therefrom by spraying water or steam upon the surfaces of the stone.

For carrying out the invention I have devised an arrangement of appliances, which will be described in relation to the accompanying drawings.

Figure 4:
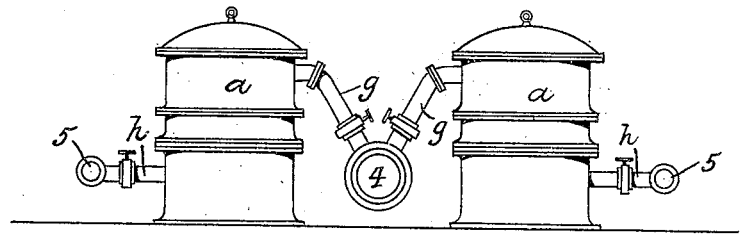
Figure 5:
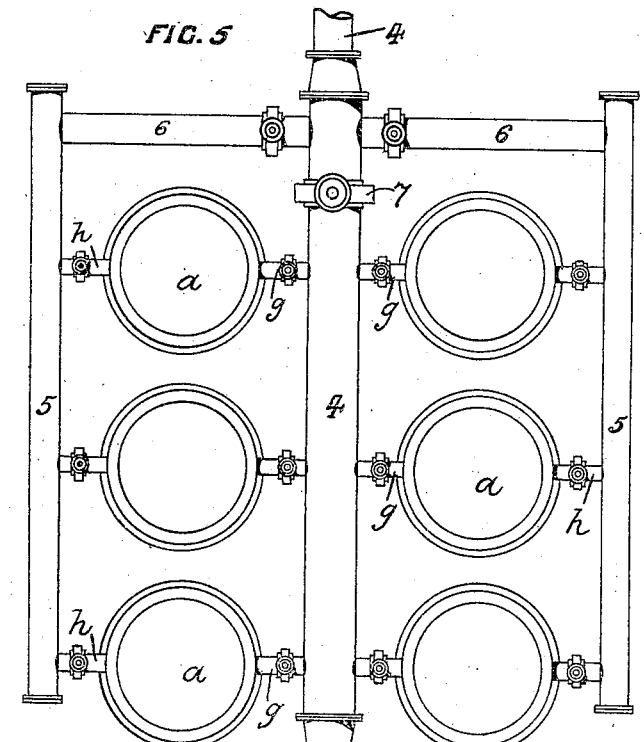
Figure 6:
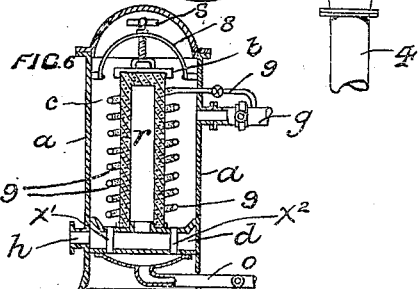
Figure 7:
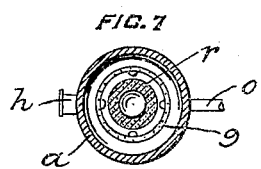

Figure 1 is a vertical section of a single filter. Fig. 2 is a cross-section of the same on the line 2 2 of Fig. 1. Fig. 3 is a cross-section on the line 3 3 of Fig. 1. Figs. 4 and 5 are end elevation and plan, respectively, showing a number of the filters coupled together for dealing with large quantities of liquids. Figs. 6 and 7 are sectional elevation and sectional plan, respectively, of a form of device suitable for filtering a small quantity of water, such as that used for households.

The filter consists of a closed metal casing $a$, preferably cylindrical in form and the top end cover of which is made removable. The casing is arranged in a vertical position and is divided into three chambers $b$, $c$, and $d$ by means of divisional plates $e$ and $f$, extending horizontally across it. To the top chamber $b$ an inlet-pipe $g$ leads, and from the bottom chamber $d$ an outlet-pipe $h$ leads away. From the middle chamber $c$ a pipe $o$ leads downward through the bottom chamber and then out through the side of the casing $a$. It is provided with a sluice-valve $j$, by means of which it may be opened or closed.

The divisional plate $e$ is formed with an opening $k$ in its center, through which a passage is obtained from the top chamber $b$ to the second chamber $c$. This opening is adapted to be covered by means of a slide-valve $l$, actuated by a screw-threaded rod $m$, passing outward to the outside of the casing through a stuffing-box and then through a threaded bearing $n$, attached to the casing. By turning the rod in the bearing the valve may be caused to slide on the plate $e$ and cover or uncover the opening $k$. In the drawings, Fig. 1, the opening is shown closed in full lines and open by dotted lines.

The divisional plate $f$ is preferably formed with a dip downward toward the center, and from the bottom of this dip the pipe $o$ leads. Arranged in concentric circles around the plate and at regular intervals apart are apertures $p$, that open through the plate into the chamber $d$ below.

Within the middle or filtering chamber $c$ are placed a number of vertical hollow pillars or cylinders $r$, of porous stone, the top ends of which are closed, while the bottom ends are open. One of these stone cylinders is placed immediately above each of the apertures $p$ in the division-plate $f$ and rests upon a small platform formed round the top of such aperture. The cylinders are thus arranged in concentric circular rows, as shown in Figs. 2 and 3 of the drawings. Passages are thereby formed from the centers of the cylinders into the chamber $d$. The cylinders are retained in position and hard down upon the plate $f$ by means of set-screws $s$, bearing upon caps $t$, fitting on the top ends of the cylinders. These screws are threaded through metal rings $u$, placed above the tops of the cylinders and kept rigidly in position by means of studs $w$, Figs. 2 and 3, passing upward from the plate $f$.

The pillars $r$ may be of any other approved shape in cross-section and may be formed of any stone which will allow of liquids being forced through. The kind of stone particularly applicable for use with the filter is that found in the Colony of New Zealand and known as "Oamaru" or "Mount Somers"

stone and the principal constituent of which is carbonate of lime.

A number of perforated water-tubes $x$ are arranged vertically among the cylinders $r$. These tubes pass upward through the divisional plate $e$ and their top ends open into the top chamber $b$.

In operation for filtering purposes the opening $k$ will be uncovered and the valve $j$ of the pipe $o$ closed. The liquid to be treated will be delivered into the chamber $b$ through the pipe $g$ under pressure. From thence it will pass through into the chamber $c$. The pressure of the fluid will then force it through the walls of the cylinders $r$ into the centers thereof, and it will flow down them into the chamber $d$ and out through the pipe $h$. As the liquid passes through the porous-stone cylinders it will be robbed of its impurities and any solid matters which will then remain in suspension in the water within the chamber $c$ or will be coated upon the outside of the porous cylinders.

To clean the filter, the opening $k$ is closed and the valve $j$ of the pipe $o$ opened. The water from the chamber $b$ will then flow down the pipes $x$ and by its pressure will be sprayed through the perforations therein onto the outside faces of the cylinders, so as to clean them of any impurities adhering thereto. The dirt and water in the chamber will then flow out through the pipe $o$ to any desired point. Instead of water steam may be forced through these pipes.

The filter will be provided with a safety-valve $z$ to allow of the escape of any excess of liquid within the chamber $c$.

In Figs. 4 and 5 a number of filters are shown arranged in a manner suitable for dealing with town or other large supplies. The filters are arranged in two parallel rows, the main supply-pipe 4 passing between the rows and being enlarged in diameter. From the main the inlet-pipe $g$ of each filter leads. The outlet-pipes $h$ from each row of filters lead to a pipe 5, laid parallel with the main and which is joined thereto by a branch 6. A valve 7 controls the main 4, and this valve is placed at a point between the joints of the filter inlet-pipes $g$ with the main and those of the branches 6. When the valve 7 is closed, a water-chamber will be formed in the enlarged portion of the main, and from it the filters will be fed, and the water after passing through the filters will be collected in the pipes 5 and be conveyed back again to the main upon the other side of the valve. The various pipes and branches are provided with valves, so that any one or more of the filters may be cut out from use as may be desired, or the valve 7 may be opened and the water allowed to flow straight through the main.

The arrangement here shown is shown as an example of how the filters may be combined together for working purposes and forms no essential feature of the invention. Other ways of coupling them together may be devised, if so desired.

In cases where the quantity of water to be filtered is limited (as in a household supply) a modified form of filter may be employed. A form suitable for this purpose is shown in Figs. 6 and 7. This shows a single porous cylinder held in position by a bowed strap 8, hinged to the sides of the filtering-chamber and through which the set-screw $s$ passes. This strap is capable of swinging down to one side, so as to leave the way clear for the insertion or withdrawal of the porous cylinder. In this form the top chamber is done away with, only two chambers being provided, and the service-pipe $g$ enters the filtering-chamber direct. This service-pipe is provided with a by-pass 9, which passes also into the chamber and then loosely encircles the porous cylinder. The portion of the pipe encircling the cylinder is perforated, so that when water is allowed to pass into it the cylinder will be sprayed, so as to cleanse it from any impurities adhering thereto. The water thus sprayed then passes off through small tubes $x'$ and $x^2$ and into the outlet-chamber and is discharged through the sludge-pipe $o$ in the same manner as with the larger type of appliance. The filtered water passes off from the lower chamber through the pipe $h$.

What I do claim as my invention, and desire to secure by Letters Patent, is—

In water-purifiers, a casing divided into three chambers by horizontal divisional plates, an inlet leading to the top chamber, an outlet leading from the bottom chamber, an aperture in the top divisional plate, a slide-valve adapted to cover and uncover such aperture and a pipe, controlled by a valve leading from the bottom of the middle chamber to outside the casing, in combination with a number of hollow pillars of porous stone arranged vertically within the middle chamber, apertures formed in the lower divisional plate, over each one of which a hollow pillar rests, and a number of perforated pipes opening from the top chamber and extending downward through the middle chamber interspersed with the hollow pillars, substantially as specified.

In testimony whereof I have signed this specification in the presence of two subscribing witnesses.

WILLIAM COWERN.

Witnesses:
W. ALEXANDER,
M. A. MARCHANT.